United States Patent [19]
Houghton

[11] Patent Number: 5,645,155
[45] Date of Patent: Jul. 8, 1997

[54] CONVEYOR NOISE ISOLATION AND WEAR PREVENTION SYSTEM

[75] Inventor: Harry Houghton, Orland Park, Ill.

[73] Assignee: Automotion, Inc., Worth, Ill.

[21] Appl. No.: 414,487

[22] Filed: Mar. 31, 1995

[51] Int. Cl.$^6$ ................................................ B65G 13/00
[52] U.S. Cl. ........................................ 193/35 R; 193/37
[58] Field of Search ..................... 198/780; 193/35 R, 193/37

[56] References Cited

U.S. PATENT DOCUMENTS

| | | | |
|---|---|---|---|
| 3,053,368 | 9/1962 | Klahn | 193/35 |
| 3,416,638 | 12/1968 | Buck | 193/37 |
| 3,751,122 | 8/1973 | Dubay | 308/63 |
| 4,059,180 | 11/1977 | Krivec et al. | 193/37 |
| 4,148,386 | 4/1979 | Bradbury | 193/37 |
| 4,241,825 | 12/1980 | Brouwer | 198/782 |
| 4,311,226 | 1/1982 | Thompson et al. | 198/35 R |
| 4,444,301 | 4/1984 | Granberry | 193/35 R |
| 4,681,203 | 7/1987 | Kornylak | 198/35 R |
| 5,048,661 | 9/1991 | Toye | 198/35 R |
| 5,415,272 | 5/1995 | Boschert et al. | 198/35 R X |
| 5,421,442 | 6/1995 | Agnoff | 198/35 R X |

*Primary Examiner*—D. Glenn Dayoan
*Attorney, Agent, or Firm*—Wood, Phillips, VanSanten, Clark & Mortimer

[57] ABSTRACT

The invention is embodied in a conveyor roller noise-isolator and wear-prevention system for mounting a conveyor roller to a conveyor system support frame. An apparatus is provided in which a conveyor roller axle is mounted to a conveyor side frame by a resilient bushing which serves to isolate the noise generated at the roller, prevent the noise generated at the interface between the axle and the frame, and prevent wear on the axle and the frame. The bushing achieves these goals by eliminating metal-to-metal contact at the mount interface and by having interference fits with the axle and with the frame to prevent relative motion.

15 Claims, 1 Drawing Sheet

CONVEYOR NOISE ISOLATION AND WEAR PREVENTION SYSTEM

FIELD OF THE INVENTION

This invention relates to conveyor systems, and more particularly, to conveyor systems having rollers mounted to a frame.

BACKGROUND OF THE INVENTION

Currently, conveyor systems utilize rollers supported at each end by side frame members. It is common for the rollers to be supported on bearings mounted onto axles having a hexagonal cross section. The axles are then inserted into hexagonal openings formed in the frame members. The hexagonal cross section prevents rotation of the axle in the frame and rotation of the bearing inner race on the axle. Typically, the axles and side frame members will be made from metal. It is also typical for the axle to fit somewhat loosely into the opening in the side frame to allow for ease of assembly and slight misalignments between the side frame members. This arrangement for mounting the rollers to the side frame creates problems with both noise generated by the conveyor system, and wear of the axles and side frame members.

Because of the metal-to-metal contact between the axle and side frame member, noise generated by rotation of the rollers is easily transmitted to and amplified by the side frame members. Additional noise is generated by the loose fit between the axle and the side frame members. The combined effects of noise transmitted from the rollers to the side frame members and noise generated at the mount interface between the axle and the frame can create a serious problem for users of conveyor systems.

Additionally, the metal-to-metal contact between the axles and the side frame members generates wear in both the axle and the openings in the side frame members. This problem is most severe when the axle has a loose fit within the opening, which allows for relative motion between the axle and the side frame member each time an article is conveyed over the roller. Even when the axle is mounted with a tight fit to the opening, wear is generated in the metal-to-metal contact due to fretting as articles are conveyed over the roller. Replacement of worn conveyor components, especially the side frame members, can be expensive due to the cost of replacement parts, the cost of assembly, and the down time of the conveyor system.

One current attempt at solving the problem of noise and wear in a conveyor system involves the use of customized side frame members in a multi-piece bearing block made from nylon or synthetic resin. This is expensive and not easily adaptable to standard conveyor systems.

There is a need for a new and inexpensive apparatus for mounting conventional conveyor rollers to conventional conveyor side frame members to prevent wear and to reduce noise levels generated by articles being conveyed over the rollers.

SUMMARY OF THE INVENTION

In accordance with the present invention, an apparatus is provided in which a conveyor roller axle is mounted to a conveyor side frame by a resilient bushing which serves to isolate the noise generated at the roller, prevent the noise generated at the interface between the axle and the frame, and prevent wear on the axle and the frame. The bushing achieves these goals by eliminating metal-to-metal contact at the mount interface and by having interference fits with the axle and with the frame to prevent relative motion.

According to the present invention, a conveyor roller noise isolator system for mounting a conveyor roller to a conveyor system support frame is provided with a frame having an opening, a conveyor roller axle, and a resilient unitary bushing insertable into the frame opening. The bushing has a body with an inside surface and an outside surface separated by a wall. The outside surface of the bushing has a non-circular cross section that is shaped and sized to be received by the opening in the frame. The inside surface of the bushing defines an axle opening having a non-circular cross section that is shaped and sized to receive the axle. Either the axle opening cross section or the outside surface cross section, or both, are shaped and sized for an interference fit between either or both the bushing and the frame or the bushing and the axle. The interference fit deforms the wall of the bushing to securely engage the bushing to the frame and to the axle when the bushing is inserted into the frame and the axle is inserted into the bushing.

In a preferred embodiment, the axle opening cross section is shaped and sized for an interference fit with the axle which will deform the bushing wall to create an interference fit between the outside bushing surface and the frame. Additionally, the bushing outside surface cross-section is shaped and sized for an interference fit with the opening in the frame which deforms the wall.

Another feature is that the bushing is provided with an insertion end and a flanged end. The insertion end is inserted into the frame, while the flanged end limits the depth of insertion. A slot is provided through the wall between the inside surface and the outside surface of the bushing. This slot extends longitudinally from the insertion end of the bushing. The slot eases insertion of the bushing into the frame opening by allowing the wall of the bushing to deflect. A tab is provided on the bushing for indicating the slot location so that the slot location relative to the frame can be verified after the bushing is inserted.

A further feature of the invention is the provision of an electrical conductive clip for discharging static electricity that is built up by the rollers during operation of the conveyor system. The conductive clip is inserted into the bushing so that it will contact both the axle and the frame when the bushing is inserted into the frame and the axle is inserted into the bushing. Alternatively, the discharge of static electricity can also be provided by including a conductive filler in the selected bushing material.

The present invention provides an inexpensive, replaceable bushing which is adapted for use with conventional axles and frame members to provide a conveyor wear-prevention and noise-isolation system. Other objectives, features and advantages of the invention will be apparent from the following detailed description taken in conjunction with the accompanying drawings.

BRIEF DESCRIPTION OF THE DRAWINGS

The features of this invention which are believed to be novel are set forth with particularity in the appended claims. The invention, together with its objections and advantages thereof may best be understood by reference to the following description taken in conjunction with the accompanying drawings, in which like reference numerals identify like elements in the Figures and in which:

DETAILED DESCRIPTION OF THE PREFERRED EMBODIMENT

Figure 1:
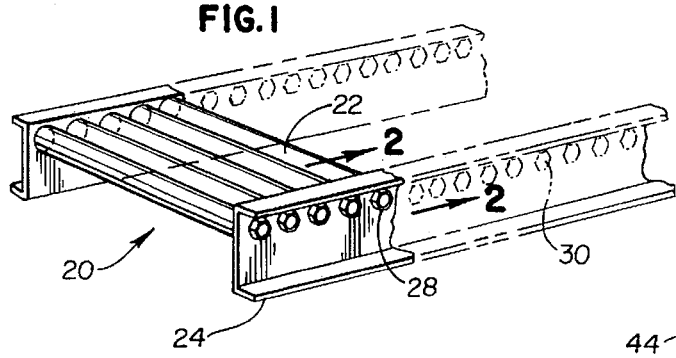
FIG. 1 is a perspective view of a conveyor roller noise isolator and wear prevention system for mounting a conveyor roller to a conveyor system support frame embodying the present invention.
Figure 2:
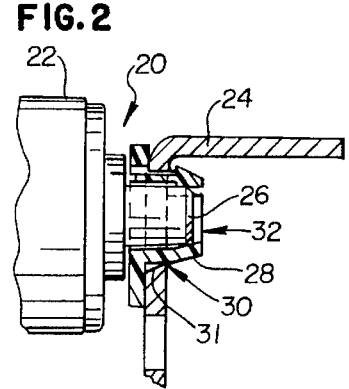
FIG. 2 is a fragmented sectional view of the conveyor system shown in FIG. 1 taken along the line 2—2.
Figure 6:
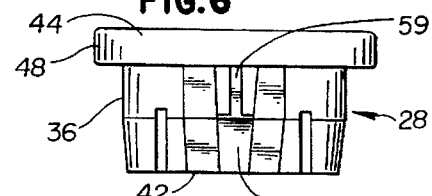
FIG. 6 is a view from above of the bushing shown in FIG. 5.
Figure 3:
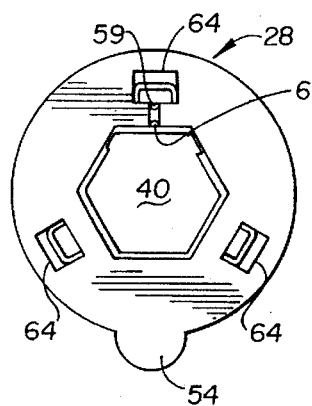
FIG. 3 is a front elevation view of the bushing used in the conveyor system shown in FIG. 1.
Figure 4:
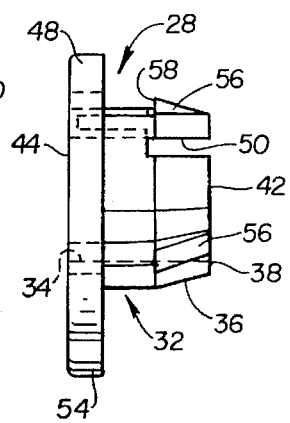
FIG. 4 is a side elevation view of the bushing shown in FIG. 3.
Figure 5:
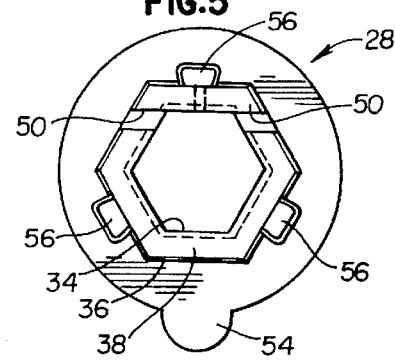
FIG. 5 is a rear elevation view of the bushing shown in FIGS. 3 and 4.

A conveyor roller noise-isolator and wear-prevention system 20, as seen in FIG. 1, mounts a conveyor roller 22 to a conveyor system support frame 24. As best seen in FIG. 2, the system includes frame 24, conveyor roller axle 26, and a resilient, unitary bushing 28. The frame has an opening 30, defined by peripheral surface 31, into which bushing 28 is inserted, and the bushing has an axle opening 40 into which the axle 26 is inserted.

Bushing 28 separates the axle 26 from the frame 24, thus preventing metal-to-metal contact between the axle 26 and the frame 24. This greatly reduces the noise transmitted from the roller 22 to the frame 24. Noise is further reduced by providing an interference fit between the bushing 28 and the frame 24 and between the bushing 28 and the axle 26. Further noise reduction is achieved by proper selection of a plastic, elastomer, or composite material having properties which will damp vibrations being transmitted through the conveyor system.

Wear of both the frame 24 and the axle 26 is greatly reduced by the bushing 28. The interference fits of the bushing 28 prevent relative motion which produces wear. Further, because the bushing 28 is made from a material having a hardness that is less than the hardness of the axle 26 and the frame 24, wear will tend to take place in the bushing 28, rather than in the frame 24 or the axle 26. When the bushing 28 is so worn that the fit between the bushing 28 and the axle 26 or between the bushing 28 and the frame 24 is no longer acceptable, the bushing 28 can be replaced with a new bushing 28. This is much cheaper than replacing either the frame or the roller axle.

Thus, bushing 28 serves the dual purpose of isolating noise generated by articles being conveyed over the rollers 22, and preventing wear of the conveyor roller axle 26 and the frame 24.

Details of the resilient unitary bushing 28 are shown in FIGS. 3, 4, 5 and 6. Bushing 28 has a unitary body 32 with an inside surface 34 and an outside surface 36. The inside surface 34 and the outside surface 36 are separated by a wall 38. The inside surface 34 defines an axle opening 40 having a non-circular cross section in the form of a hexagon that is shaped and sized to receive the axle 26. The outside surface 36 has a non-circular cross section in the form of a hexagon which is shaped and sized to be received by the opening 30 in the frame 24.

In the preferred embodiment, the body has an insertion end 42 and a flanged end 44 having a flange 48 formed thereon. The outside surface 36 is tapered such that the size of the cross section increases from the insertion end 42 to the flanged end 48, with the taper adjacent the insertion end being more pronounced than the taper adjacent the flanged end. Alternatively, this taper may occur uniformly over the entire longitudinal length of outside surface 36 or it may be isolated to certain portions of outside surface 36. This taper aids insertion of bushing 28 into the opening 30.

Likewise, inside surface 34 is tapered such that the size of axle opening 40 increases uniformly from the insertion end 42 to the flanged end 44. This taper may occur over the entire longitudinal length of the inside surface 34 or it may be isolated to certain portions of the inside surface 34. This taper aids in insertion of axle 26 into axle opening 40 from the flanged end 44.

Bushing 28 is provided with a slot 50 that extends through the wall 38 in two places. The slot 50 opens towards the insertion end 42. The slot 50 allows wall 38 to more easily deflect when inserted into opening 30. This aids in insertion of bushing 28 into the frame 24.

The bushing 28 has indicia in the form of tab 54 for indicating the location of slot 50 when the bushing 28 is inserted into the frame 24. This aids in insuring that bushing 28 is inserted in a preferred manner, with slot 50 being located at the top of bushing 28 so that the uninterrupted portions of wall 38 bear any loads being transferred to the frame 24 from the axle 26.

Locking lugs 56 are provided on the outside surface 36 of the bushing 28. The locking lugs 56 are ramped towards the insertion end 42. Each locking lug 56 has an abutting surface 58 which opposes the flange 48. The abutting surfaces 58 abut the surface of the frame 24 after the bushing 28 has been inserted into opening 30. This serves to keep bushing 28 engaged in the frame 24, especially before the axle 26 is inserted into the bushing 28 and during removal of the axle 26 from the bushing 28. Apertures 64 are provided to assist in the manufacture of the locking lugs 56, such as when the bushing 28 is injection molded.

Figure 9:
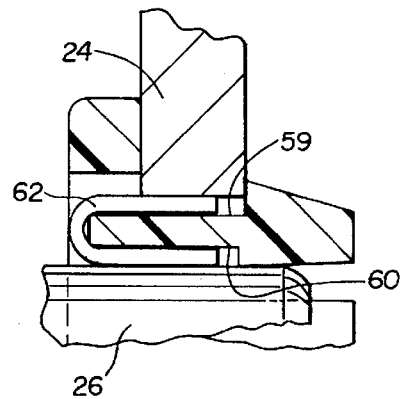
FIG. 9 is an enlarged fragmented sectional view of a preferred embodiment of the conveyor system shown in FIG. 1, with an electrical conductive clip inserted into the bushing such that the clip contacts both the axle and the frame.

As best seen in FIG. 9, opposing grooves 59 and 60 are provided in the inside and outside surfaces 34 and 36 on either side of wall 38. The grooves 59 and 60 allow a conductive clip 62 to be inserted into bushing 28. When the axle 26 is inserted into the bushing 28, conductive clip 62 contacts both the axle 26 and the frame 24, thereby serving to discharge any static electricity which is built up in rollers 22 during operation of the conveyor system.

Alternatively, discharge of static electricity from the rollers 22 to the frame 24 is provided by carbon fillers included in the material of the bushing body 32. These carbon fillers allow the material itself to conduct the static discharge.

Figure 7:
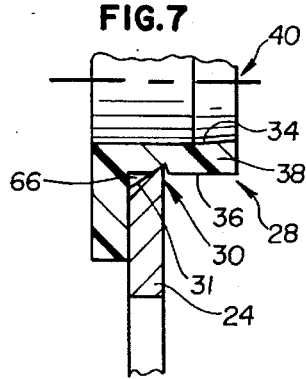
FIG. 7 is an enlarged fragmented sectional view of the conveyor system shown in FIG. 1, with the bushing installed in the frame but with the axle removed from the bushing.
Figure 8:
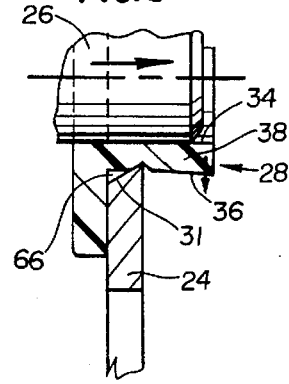
FIG. 8 is an enlarged fragmented sectional view of the conveyor system of FIG. 1, with the bushing installed in the frame and the axle installed in the bushing.

As best seen in FIGS. 7 and 8, the cross section of outside surface 36 of the bushing 28 is shaped and sized to have an interference fit with the frame 24. To create the interference fit, the outside surface 36 has a cross section that is similar to the cross section of the frame opening 30, but slightly larger. When bushing 28 is installed in the frame 24, the outside surface 36 is compressed by the peripheral surface 31 of the opening 30. This deformation creates compressive forces between the outside surface 36 and the frame 24 which serve to securely engage bushing 28 to the frame 24.

The cross section of axle opening 40 is also shaped and sized to have an interference fit with the axle 26. To create the interference fit, the axle opening 40 will have a cross section that is similar to the cross section of the axle 26, but slightly smaller. When axle 26 is inserted into the axle opening 40, the inside surface 34 of the bushing 28 is expanded by the axle 26. This deformation creates compressive forces between the inside surface 34 and the axle 26. These compressive forces serve to securely engage the axle 26 to the bushing 28. As best seen in FIG. 8, this interference fit also serves to further deform bushing 28 by compressing wall 38 between the axle 26 and the frame 24. This serves to further securely engage the bushing 28 to both the axle 26 and the frame 24.

Thus, the combined interference fits of the axle 26 and the frame 24 with the bushing 28 serve to create compressive forces which lock all three members 26, 28 and 24 together.

Again referring to FIGS. 7 and 8, it is common for openings 30 to be formed in frame 24 by means of a punch tool. It is inherent in such tools that the peripheral surface 31 of the openings 30 will have a draft angle as a result of the punching operation. The draft angle shown is exaggerated for clarity. Bushing 28 is inserted into the side of the opening 30 having the larger size due to the draft angle. As best seen in FIG. 7, the interference fit between outside surface 36 of the bushing 28 and the frame 24 might not be sufficient to fully engage the outside surface 36 with the peripheral surface 31 due to the draft angle. This results in a gap 66 between the outside surface 36 and the peripheral surface of the opening 30. The gap 66 can be either completely or partially closed by proper sizing of the interference fit between the axle 26 and the inside surface 34 of the bushing 28. As seen in FIG. 8, the interference fit between the axle 26 and inside surface 34 will deform wall 38 so that the gap 66 is either completely or partially closed.

Proper selection of a material for the bushing 28, such as urethane, will allow the interference fits anticipated by the present invention to be created during assembly without the use of excessive assembly forces. However, the material cannot be so resilient that it is easily damaged during operation of the conveyor system due to forces transmitted from the rollers to the axle. It is also important, that the material have sufficient damping characteristics for attenuating noise generated at the rollers by articles being conveyed by the system. It has been determined that plastics, elastomers, and composites having durometers between 40 and 60 are particularly well adapted for use as material for bushing 28.

As best seen in FIG. 2, the bushing 28 can be inserted from the side of the frame 24 that faces the roller 22. The axle 26 can than be inserted into the bushing 28 in a number of ways, one of which is to spring load the axle 26 so that the axle may be compressed into the roller 22 to allow the roller to be placed between the frame members 30 and the bushings 28. The axle is then aligned with the axle opening 40 and driven by the spring into the bushing 28.

The bushing 28 can also be inserted from the side of the frame 24 that faces away from the roller. This orientation of the bushing 28 allows for the bushing 28 to be inserted into the opening 30 of the frame while the axle 26 is in the opening 30. The axle 26 is aligned with the axle opening 40 of the bushing 28 while the bushing 28 is aligned with the frame opening 30. The axle 26 is then inserted into the bushing 28 simultaneously with the bushing 28 being inserted into the frame 24.

It will be understood that the invention may be embodied in other specific forms without departing from the spirit or central characteristics thereof. The present examples, therefore, are to be considered in all respects as illustrative and not restrictive, and the invention is not to be limited to the details given herein.

I claim:

1. A conveyor roller noise isolator system for mounting a conveyor roller to a conveyor system support frame, said noise isolator system comprising;

a frame having an opening therein defined by a peripheral surface;

a conveyor roller axle;

a resilient unitary bushing insertable into the frame opening, said bushing having a body with an inside surface and an outside surface separated by a wall, said outside surface having a non-circular cross-section that is shaped and sized to be received by the opening in the frame, said inside surface defining an axle opening having a non-circular cross-section that is shaped and sized to receive the axle, and at least one of the axle opening and the outside surface cross sections of the bushing being shaped and sized for an interference fit between the bushing and the frame or between the bushing and the axle for deforming the wall to securely engage the bushing to the frame and to the axle when the bushing is inserted into the frame and the axle is inserted into the bushing.

2. The noise isolator system of claim 1 wherein at least one of the axle opening and the outside surface cross-sections of the bushing is shaped and sized for interference fits between the bushing and the frame and between the bushing and the axle for deforming the wall to securely engage the bushing to the frame and to the axle when the bushing is inserted into the frame and the axle is inserted into the bushing.

3. The noise isolator system of claim 1 wherein said outside surface cross-section is shaped and sized to have an interference fit with the opening in the frame when the bushing is inserted into the opening, and said axle opening cross-section is shaped and sized to have an interference fit with the axle and to deform the bushing body to increase the interference fit with the opening in the frame when the axle is inserted into the axle opening.

4. The noise isolator system of claim 1 wherein said axle opening cross-section is shaped for receiving the axle and the axle has a similar, but slightly larger, cross-section for deforming said bushing into secure engagement with the axle and with the frame when the bushing is inserted into the frame and the axle is inserted into the axle opening.

5. The noise isolator system of claim 1 wherein said outside surface cross-section is shaped to be received by the opening in the frame and the opening in the frame has a similar, but slightly smaller, cross-section for deforming said bushing into secure engagement with the frame and with the axle when the bushing is inserted into the frame and the axle is inserted into the axle opening.

6. The noise isolator system of claim 4 wherein said outside surface cross-section is shaped to be received by the opening in the frame and the opening in the frame has a similar, but slightly smaller, cross-section for deforming said bushing into secure engagement with the frame and with the axle when the bushing is inserted into the frame and the axle is inserted into the axle opening.

7. The noise isolator system of claim 1 wherein the opening is stamped in the frame and the periphery of the opening has a draft angle such that the size of the opening varies with depth into the opening, and the axle opening is sized to have an interference fit with the axle for expanding the bushing to at least partially fill any gap between the outside surface of the bushing and the periphery due to the draft angle.

8. The noise isolator system of claim 7 wherein the bushing is snap-fit into the frame opening and is inserted from the side of the frame with a larger opening dimension.

9. The noise isolator system of claim 1 wherein the bushing includes a material selected from the group consisting of plastics, elastomers, and composites.

10. The noise isolator system of claim 1 wherein the bushing body is of a material having a durometer between 40 and 60.

11. The noise isolator system of claim 1 further comprising an electrical conductive clip communicating with both the inside and outside surfaces for conducting electricity from the roller to the frame, such as static electricity built up by the roller during operation of the conveyor system.

12. The noise isolator system of claim 1 wherein:

said body of said bushing has a flanged end, an insertion end, and a slot through the wall between the inside surface and the outside surface extending longitudinally of the bushing from the insertion end for assisting in insertion of the bushing into the opening in the frame; and further comprising indicia on the flanged end of the bushing for indicating the slot location.

13. The noise isolator system of claim 1 wherein:

said body of said bushing has an insertion end, an end opposite the insertion end, and a flange, at the end opposite the insertion end, extending from said outside surface for limiting the depth of insertion of the bushing into the opening.

14. The noise isolator system of claim 1 wherein said wall is made from a material having a hardness that is less than the hardnesses of the axle and the frame.

15. The wear prevention system of claim 14 wherein the bushing includes a material selected from the group consisting of plastics, elastomers, and composites.

* * * * *